INVENTOR
LUTHER DAVIS, JR.

BY Robert Bruce Brodie
ATTORNEY

United States Patent Office 3,483,387
Patented Dec. 9, 1969

3,483,387
ULTRASONIC OPTICAL MODULATOR FOR TIME
COMPRESSION OF CHIRP SIGNALS
Luther Davis, Jr., Wayland, Mass., assignor to Raytheon
Company, Lexington, Mass., a corporation of Delaware
Filed July 25, 1967, Ser. No. 655,805
Int. Cl. H01j 39/12, 3/14, 5/16
U.S. Cl. 250—216
9 Claims

ABSTRACT OF THE DISCLOSURE

An apparatus for compressing signals and more particularly for time compressing changing frequency signals. A transparent acoustic delay medium has applied thereto acoustic waves representative of the signals. Light from a monochromatic light source intercepts the acoustic wave propagation path within the delay medium at the Bragg angles. This results in maximum light diffraction and the formation of a highly focussed diffracted light pattern. The focussed light pattern can be detected, and the detected signal represents a substantially time compressed version of the changing frequency signal.

BACKGROUND OF THE INVENTION

This invention relates to an improvement in apparatus for time compressing signals, and more particularly, to improvements in the apparatus for compressing changing frequency signals such as may be found in radar, sonar and communication systems.

Illustratively, in radar system it is desired to illuminate a target with as much energy as possible. When narrow energy pulses are used, they are easily discriminated at the receiver and possess low range ambiguity. There exists upper limits to the amount of peak pulse power which may be transmitted in narrow energy pulses because of the physical limitations of transmitter power tubes, for instance. However, when wider pulses are used (which contain more energy), discrimination among the echo pulses at the radar receiver is poor and the range ambiguity is large.

Signal compression is a means of operating a radar system using long pulses to obtain the resolution in accuracy of short pulses, but with the detection capability of long pulses. This is accomplished by modulating the transmitted signal. Typically, a transmitted signal in which the frequency linearly increases with time, i.e., "ramp" function, is used. The radar return signal is filtered at the receiver by a filter having a characteristic that is linearly decreasing in the time-frequency domain. A filter having such a characteristic is also known as a dispersive delay line.

As may be apparent, a frequency ramp signal applied at the input of this filter, would have the lowest frequency components delayed the longest. The highest frequency components are delayed the least amount. If a declining frequency ramp signal and the filter dual are used, the highest frequency components are delayed the longest and the lowest frequency components the shortest. Thus, the frequency components appear at the filter output at substantially the same time. This is, in other words, a narrowed or "compressed" pulse.

In the present state of the art, the dispersing delay line operates in a frequency range between 10–50 megacycles per second. In order to substantially increase the compression, it would be highly desirable to operate in a range between 200 megacycles to 1000 megacycles per second. Using present techniques, such compression could only be achieved with extraordinarily large electromagnetic filters. Such filters are quite large and present phase matching problems.

It is, accordingly, an object of the invention to extend the frequency range within which a signal compression system may be efficiently operative.

It is another object of the invention to increase the operative frequency range without the use of electromagnetic filters or lossy elements.

It is yet another object of the invention to increase the compression of signals without substantially increasing power dissipation.

SUMMARY OF THE INVENTION

In accordance with this invention, the compression of changing frequency signals is achieved using a suitably optical transparent acoustic delay medium. A transducer responsive to the signals launches corresponding traveling acoustic waves within the delay medium. The refraction index of the delay medium varies according to the periodicity of the incident acoustic wave. The delay medium consequently appears as a moving diffraction grating with a changing grating spacing to an incident light source. If light from a monochromatic light source intercepts the acoustic wave propagation path such that the sines of the incidence angles are proportional to the acoustic wave frequencies along the propagation path at a particular instant of time, then the diffraction intensity is maximized at that instant. The result is a highly focussed light spot. This focussed spot moves through space at two times the velocity of sound in the delay medium. This spot intercepts a correctly positioned slit for a short time compared to the duration of the incident signal.

DESCRIPTION OF THE PREFERRED EMBODIMENT

Figure 1:
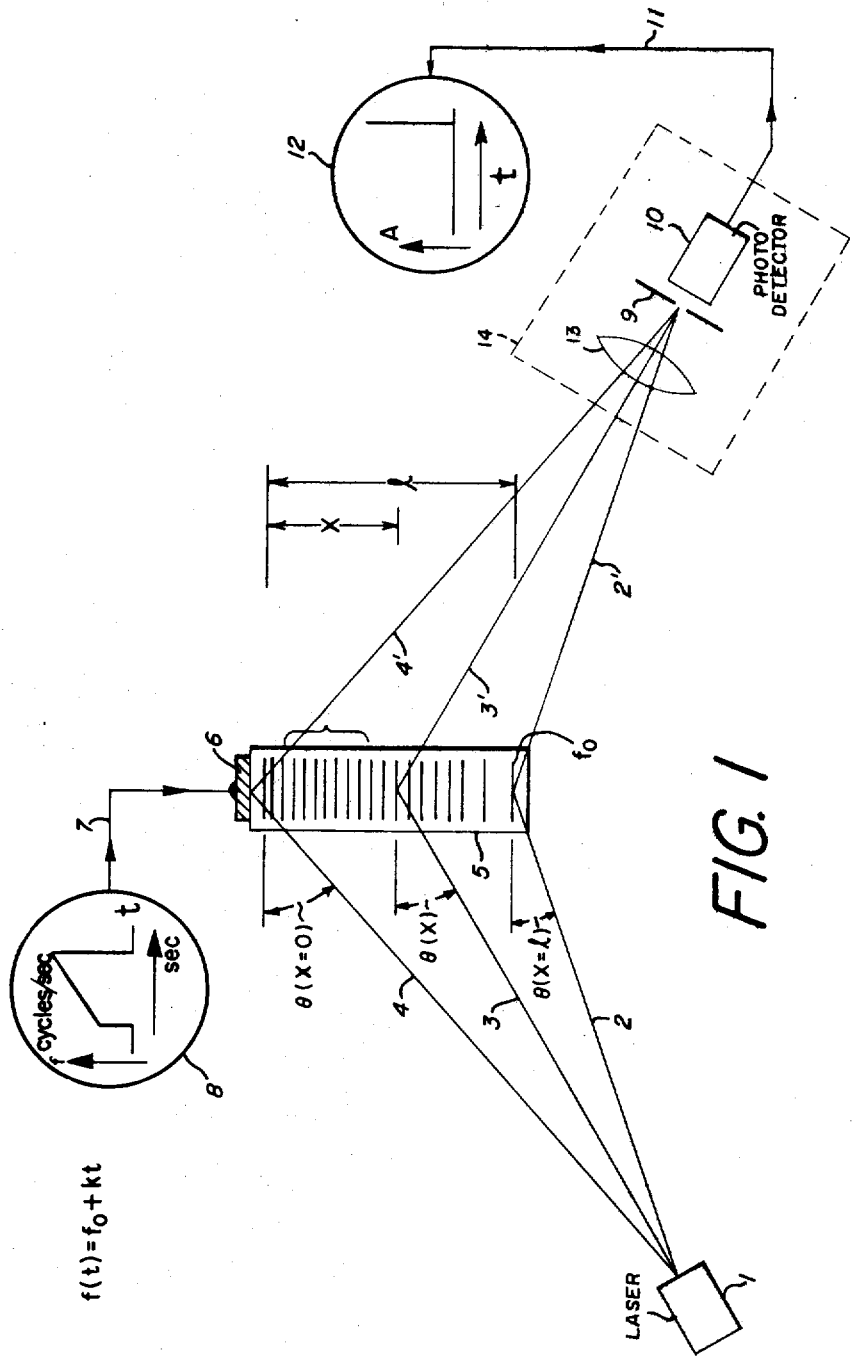
FIG. 1 is a diagrammatic representation of the apparatus for compressing changing frequency signals according to the invention.

A laser light source 1 radiates a divergent monochromatic light beam, of which three rays 2, 3 and 4, are shown, upon a suitable optically transparent acoustic delay medium 5. A source of changing frequency signals 8 is coupled to a transducer 6 over a conducting path 7. In this regard, transducer 6 is mounted contiguous to a portion of the surface of the acoustic delay medium 5. An arrangement 14 is positioned on the opposite side of delay medium 5 for intercepting the converging rays 2', 3', 4'. Arrangement 14 includes a converging lens 13 positioned to focus the intercepted rays upon an apertured mask 9. The mask is placed between lens 13 and a photodetector 10. A display or utilization circuit 12 is directly coupled to photodetector 10 over conducting path 11.

For purposes of explanation, a linearly increasing frequency change is depicted at source 8. The acoustic wave representation is shown as the vertical column of horizontal bars within the acoustic delay medium 5 at the instant of optimum focussing. The low frequency components $f_0$ have been delayed the longest and appear at the bottom of the medium, while the high frequency components $f_0+Kt$ have been delayed the least and appear in the upper portion of the delay medium.

For purposes of illustration, the propagation path of length $l$ is measured from the point of transducer contact to the end of the delay medium. At any distance along this propagation path an angle of incidence $\theta$ may be measured. This incident angle $\theta$ is measured at the point of intersection between an incident light beam and a line normal to the acoustic path at that point. When $x$ is equal to 0, the incident angle is the angle formed by light beam 4 and a line normal to the acoustic path at their point of interaction.

The source of changing frequency signals 8 has diagrammatically displayed therein a graph, the ordinate of which is the frequency $f$ in cycles per second and the abscissa of time in seconds. Such a signal source may be an amplified radar return signal or, illustratively, an RF generator such as a magnetically focussed backward wave oscillator. Such an oscillator may be modulated to produce a linear "chirp" by varying the voltage on the sole of the oscillator tube.

The transducer 6 coupled to source 8 over conductor 7 may be formed from cadmium sulphide or zinc oxide deposited upon the surface of the acoustic delay medium 5. These transducers exhibit the appropriate piezo-electric properties and can efficiently convert electromagnetic waves into longitudinal or transverse acoustic waves into the delay medium 5. The transducer action can also be obtained through surface excitation of the piezo-electric acoustic delay medium such as lithium niobate ($LiNbO_3$).

The delay medium needs only to be transparent to the monochromatic light source being used. In this embodiment, a cut sample of yttrium gallium garnet ($Y_3Ga_5O_{12}$) about two inches long and 3/8 inch square is used. The crystal must be cut along any one of the pure mode axes for acoustic wave propagation, i.e. [100], [110], and [111].

The source of monochromatic light may be any type of laser of either the continuous or pulse type. Illustratively, a laser of the pulsed argon ion type generating one watt peak pulse power of 5 microseconds duration is suitable with beam spreading optics (not shown). The percentage bandwidth of light need only be less than the required percent resolution of the compressed pulse.

$$\frac{\Delta \lambda_L}{\lambda_L} << \frac{\Delta \tau}{T}$$

The photodetector 10 may be a photomultiplier of tube type 7265. The width of aperture 9 should be made as small as possible without losing the signals and substantially less than twice the velocity of sound (2V) in the medium divided by the frequency difference ($\Delta f$) between the beginning and the end of the signal. For a typical delay line medium and a frequency difference of 200 megacycles per second, then the aperture width is approximately .001 inch.

If the acoustic beam width is greater than the ratio of the wavelength of sound squared to the wavelength of light, then Bragg scattering can be obtained. When Bragg scattering is obtained, then:

$$\sin \theta = \frac{\lambda_L}{2\lambda_S} = \frac{\lambda_L}{2V}(f_S)$$

$\theta$ is the incident angle of the light beam of vacuum wavelength $\lambda_L$. $\lambda_S$ is the wavelength of sound, and V is the velocity of the sound beam in the medium. $f_S$ is the frequency of the sound beam.

If a linear changing frequency signal such as a ramp or "chirp" is employed to excite the transducer, the corresponding acoustic wave at any point $x$ along the propagation path in the medium has the frequency distribution:

$$f_S(xt) = f_0 + K(t - x/V)$$

where $0 \leq (t - x/V) \leq T$.

$f_0$ represents the frequency of the applied acoustic wave while K is the frequency rate of change in cycles per second. Time in seconds is denoted by $t$. T is the duration of the frequency modulated signal and of the applied acoustic wave. As previously mentioned, $x$ is the length along the propagation path $l$ measured from the transducer. In order that all of the frequencies are simultaneously scattered, the incident monochromatic light beam must diverge. The angles are made to satisfy the relationship:

$$\sin \theta (x) = \frac{\lambda_L}{2V}\left[f_0 + K\left(\frac{l-x}{V}\right)\right]$$

In physical terms, the moment the entire acoustic wave is in the delay medium, the Bragg condition is met simultaneously all along the propagation path. The diffracted beam is focussed at the apertured mask 9. When the entire acoustic wave is *not* within the medium, little light is scattered. The converging scattered light or diffraction pattern emergent from the delay medium appears at a display device, such as an oscilloscope or a detector, as an impulse of time width $$\Delta \tau \approx \frac{1}{KT}$$

Figure 2:
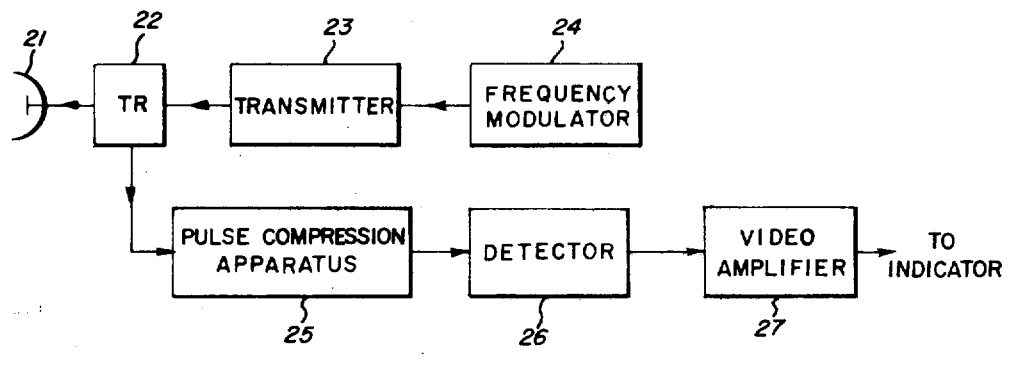
FIG. 2 is a block diagram of a typical radar receiver using the invention as represented in FIG. 1.

In FIG. 2, antenna 21 is fed by the transmit-receive electronic switch 22. In the transmit mode, frequency modulator 24 excites transmitter 23. The transmitter sends the modulated pulses to antenna 21. When the echo pulses or signals are received at antenna 21, they are shunted by the TR switch 22 directly to pulse compression apparatus 25. This is shown in FIG. 1 as source 8 coupled to transducer 6. The output of the apparatus 25 is fed either to detector 26 or video amplifier 27.

If the linearly changing frequency signal applied to compression apparatus 25 is swept over 60 megacycles from 1130 to 1190 megacycles in two microseconds, the pulse at the output appears as 17 nanoseconds in width. This is indicative of a compression ratio of approximately 120.

In principle, the time-bandwidth of the apparatus is limited only by the bandwidth of the transducer and the time duration of the applied acoustic wave. The time duration of the applied acoustic wave is limited by the length of the delay material available. Such a delay length is in the order of 10 microseconds. The cadmium sulphide and the zinc oxide evaporated transducers have many hundreds of megacycles of bandwidth. Since the diffraction limit of the apparatus is inversely proportional to the bandwidth of the applied acoustic wave, then the higher the bandwidth the higher the resolution and the shorter the compressed pulse.

K, representing the linear rate of change of frequency per unit time, is positive when the rate of change is increasing and negative when the rate of change is decreasing.

It should be noted that the acoustic delay medium need be transparent only to the frequency of the monochromatic light source being used.

The foregoing embodiment is illustrative only and should not be taken as limiting upon the true scope of the invention.

I claim:
1. An apparatus for time compressing changing frequency signals comprising:
   a transparent acoustic delay medium;
   transducing means responsive to the signals for launching corresponding acoustic waves within the transparent acoustic delay medium; and
   characterized in that the apparatus further comprises:
     a source of monochromatic light whose beams intercept the acoustic wave propagation path within the transparent acoustic delay medium at the Bragg angles; and
     means responsive to a portion of the diffraction light patterns from the transparent acoustic delay medium for developing a corresponding signal.

2. An apparatus for time compressing changing frequency signals comprising:
   a transparent acoustic delay medium whose refraction index varies according to the periodicity of incident acoustic waves; and
   transducing means responsive to the signals for launching corresponding acoustic waves within the transparent acoustic delay medium;
   characterized in that the apparatus further comprises:
     a source of monochromatic light whose beams intercept the acoustic wave propagation path and adjusted such that the sine of the Bragg angles are proportional to the acuostic wave frequency along the propagation path; and means responsive to a portion of the diffraction light patterns from the transparent acoustic delay medium for developing a corresponding signal.

3. An acoustic signal compressor comprising:
a frequency changing acoustic wave generator;
a source of monochromatic light; and
a transparent acoustic delay medium responsive to acoustic waves from the generator for scattering incident monochromatic light emanating from the source;

characterized in that the delay medium is so positioned with respect to the light source that the sine of the incident angle of the light beam is directly proportional to the signal frequency along their points of interaction; and the compressor further comprises:
means responsive to a portion of the diffraction light patterns from the transparent acoustic delay medium for developing a corresponding signal.

4. An apparatus for compressing acoustic signals having an initial frequency $f_0$ and which changes at the rate of K cycles per second in time $t$ seconds comprising:

a transparent acoustic delay medium responsive to the acoustic signals for propagation at a characteristic velocity V and a wavelength $$\lambda_S = \frac{V}{f_0 + K\left(t - \frac{x}{V}\right)}$$

characterized in that the apparatus further comprises:
a monochromatic light source of wavelength $\lambda_L$ is positioned with respect to the medium such that the sine of the angle of incidence $\theta$ formed at the intersection of the light emanating from the source and the acoustic propagation path within the medium at any position $x$ satisfies the relationship:

$$\sin(\theta) = \lambda_L \frac{\left(f_0 + K\left(t - \frac{x}{V}\right)\right)}{2V} ; \text{ and}$$

means responsive to a portion of the diffraction light patterns from the transparent acoustic delay medium for developing a corresponding signal.

5. An apparatus for compressing acoustic signals according to claim 4, characterized in that:
the light source and the detection means are separated by a fixed distance, and further characterized in that the width of the emergent light diffraction pattern at the detection means varies directly as the product of the wavelength $\lambda_L$ and the fixed distance separation, and further varies inversely with the product of the acoustic propagation velocity V and the time duration T of the acoustic signal.

6. An apparatus for compressing acoustic signals according to claim 4, characterized in that:
the means responsive to a portion of the diffraction light patterns comprise:
a slotted photodetector; and
a lens intermediate the medium and the photodetector for focusing the diffracted light patterns upon the slotted photodetector.

7. An apparatus for compressing acoustic signals according to claim 6, characterized in that:
the time duration of the compressed pulse varies directly with the width of the diffraction pattern at the photodetector.

8. An apparatus for compressing acoustic signals having an initial frequency $f_0$ and which changes at the rate of K cycles per second in time $t$ seconds comprising:

a transparent acoustic delay medium responsive to the acoustic signals for propagation at a characteristic velocity V and a wavelength.

$$\lambda_S = \frac{V}{f_0 + K\left(t - \frac{x}{V}\right)}$$

characterized in that the apparatus further comprises:
a monochromatic light source of wavelength $\lambda$ positioned with respect to the medium such that the sine of the angle of incidence $\theta$ formed at the intersection of the light emanating from the source and the acoustic propagation path within the medium at any position $x$ satisfying the relationship:

$$\sin \theta = \lambda_L \frac{f_0 + K\left(t - \frac{x}{V}\right)}{2V} ; \text{ and}$$

means responsive to a portion of the diffracted light patterns from the transparent acoustic delay medium for developing a corresponding signal, said means comprising:
a slotted photodetector; and
a lens intermediate the transparent acoustic delay medium and the photodetector for focusing the diffraction light patterns upon the slotted detector.

9. A photodetector according to claim 8, characterized in that the width of the slot should be substantially less than twice the velocity of sound in the transparent acoustic delay medium divided by the frequency difference between the beginning and the end of the signal.

References Cited

UNITED STATES PATENTS

| | | | |
|---|---|---|---|
| 3,055,258 | 9/1962 | Hurvitz | 350—161 X |
| 3,189,746 | 6/1965 | Slobodin et al. | 350—161 X |
| 3,373,380 | 3/1968 | Adler | 350—160 X |
| 3,383,627 | 5/1968 | Desmares | 350—160 X |

OTHER REFERENCES

Gerig et al.: "A Simple Optical Filter for Chirp Radar," Proceedings of the I.E.E.E., vol. 52, No. 12, December 1964, p. 1753.

RALPH G. NILSON, Primary Examiner

T. N. GRIGSBY, Assistant Examiner

U.S. Cl. X.R.

250—217; 350—160, 161